(12) United States Patent
Faaborg et al.

(10) Patent No.: US 9,990,177 B2
(45) Date of Patent: *Jun. 5, 2018

(54) VISUAL INDICATION OF A RECOGNIZED VOICE-INITIATED ACTION

(71) Applicant: Google Inc., Mountain View, CA (US)

(72) Inventors: Alexander Faaborg, Mountain View, CA (US); Gustavo Sonoda, London (GB); Joshua Robin Kaplan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/220,835

(22) Filed: Jul. 27, 2016

(65) Prior Publication Data

US 2016/0335052 A1  Nov. 17, 2016

Related U.S. Application Data

(63) Continuation of application No. 14/242,427, filed on Apr. 1, 2014, now Pat. No. 9,430,186.

(Continued)

(51) Int. Cl.
*G10L 15/22* (2006.01)
*G06F 3/16* (2006.01)
*G10L 15/00* (2013.01)
*G06F 3/0484* (2013.01)
*H04M 1/725* (2006.01)
*G10L 21/10* (2013.01)

(52) U.S. Cl.
CPC ............ *G06F 3/167* (2013.01); *G06F 3/0484* (2013.01); *G10L 15/00* (2013.01); *G10L 15/22* (2013.01); *H04M 1/72519* (2013.01); *G10L 21/10* (2013.01); *G10L 2015/225* (2013.01); *H04M 2250/74* (2013.01)

(58) Field of Classification Search
CPC ... G06F 3/167; G10L 2015/225; G10L 21/06; H04M 1/271
USPC ....... 704/231, 233, 235, 246, 260, 270, 275; 715/706, 709, 727, 728, 763
See application file for complete search history.

(56) References Cited

U.S. PATENT DOCUMENTS

| 5,864,815 A | 1/1999 | Rozak et al. |
| 6,233,560 B1 | 5/2001 | Tannenbaum |

(Continued)

FOREIGN PATENT DOCUMENTS

| EP | 3028136 A1 | 6/2016 |
| WO | 2010141802 A1 | 12/2010 |

OTHER PUBLICATIONS

US 5,275,617, 09/2012, Morgan et al. (withdrawn)

(Continued)

*Primary Examiner* — Rinna Yi
(74) *Attorney, Agent, or Firm* — Shumaker & Sieffert, P.A.

(57) ABSTRACT

A computing device is described that outputs, for display, an initial speech recognition graphical user interface (GUI) having at least one element. The computing device receives audio data and determines, based on the audio data, a voice-initiated action. Responsive to determining the voice-initiated action, the computing device outputs, for display, an updated speech recognition GUI having an animation of a change in a position of the at least one element to indicate that the voice-initiated action has been determined.

12 Claims, 9 Drawing Sheets

Related U.S. Application Data

(60) Provisional application No. 61/954,539, filed on Mar. 17, 2014.

(56) References Cited

U.S. PATENT DOCUMENTS

| | | | |
|---|---|---|---|
| 7,966,188 B2 | 6/2011 | Ativanichayaphong et al. | |
| 8,328,612 B1 * | 12/2012 | Ansari | A63F 13/12 463/9 |
| 2005/0165609 A1 | 7/2005 | Zuberec et al. | |
| 2007/0033054 A1 | 2/2007 | Snitkovskiy et al. | |
| 2007/0061148 A1 | 3/2007 | Cross | |
| 2007/0088557 A1 | 4/2007 | Andrew | |
| 2008/0215240 A1 | 9/2008 | Howard et al. | |
| 2010/0257554 A1 | 10/2010 | Friedlander et al. | |
| 2010/0312547 A1 | 12/2010 | Van Os et al. | |
| 2011/0013756 A1 | 1/2011 | Davies et al. | |
| 2011/0301955 A1 | 12/2011 | Byrne et al. | |
| 2012/0110456 A1 | 5/2012 | Larco et al. | |
| 2012/0253822 A1 | 10/2012 | Schalk | |
| 2012/0253824 A1 | 10/2012 | Alcantara Talavera | |
| 2013/0018656 A1 | 1/2013 | White et al. | |
| 2013/0080178 A1 | 3/2013 | Kang et al. | |
| 2013/0110508 A1 | 5/2013 | Bak et al. | |
| 2013/0211836 A1 | 8/2013 | Jordan et al. | |
| 2013/0219277 A1 | 8/2013 | Wang et al. | |
| 2013/0253937 A1 | 9/2013 | Cho et al. | |
| 2014/0207452 A1 | 7/2014 | Klein et al. | |
| 2014/0222436 A1 | 8/2014 | Binder et al. | |
| 2014/0278443 A1 | 9/2014 | Gunn et al. | |
| 2015/0040012 A1 | 5/2015 | Faaborg et al. | |
| 2015/0261496 A1 | 9/2015 | Faaborg et al. | |

OTHER PUBLICATIONS

International Preliminary Report on Patentability from International Application No. PCT/US2015/015631, dated Sep. 29, 2016, 9 pp.

International Search Report and Written Opinion of International Application No. PCT/US2015/015631, dated May 22, 2015, 12 pp.

"Voice commands for Windows Phone 8," Microsoft 2013 [online]. Feb. 1, 2013. Retrieved from the Internet: <http:! /msdn .microsoft. com/en-us/library/windowsphone/develop/jj206959(v=vs. 1 05) .aspx> 1 0 pgs.

Prosecution History from U.S. Appl. No. 14/242,427, from Jun. 5, 2014 through Jun. 22, 2016 168 pgs.

Examination Report from counterpart European Application No. 15706628.3, dated Oct. 13, 2017, 6 pp.

Response to Examination Report dated Oct. 13, 2017, from counterpart European Application No. 15706628.3, filed Jan. 25, 2018, 5 pp.

* cited by examiner

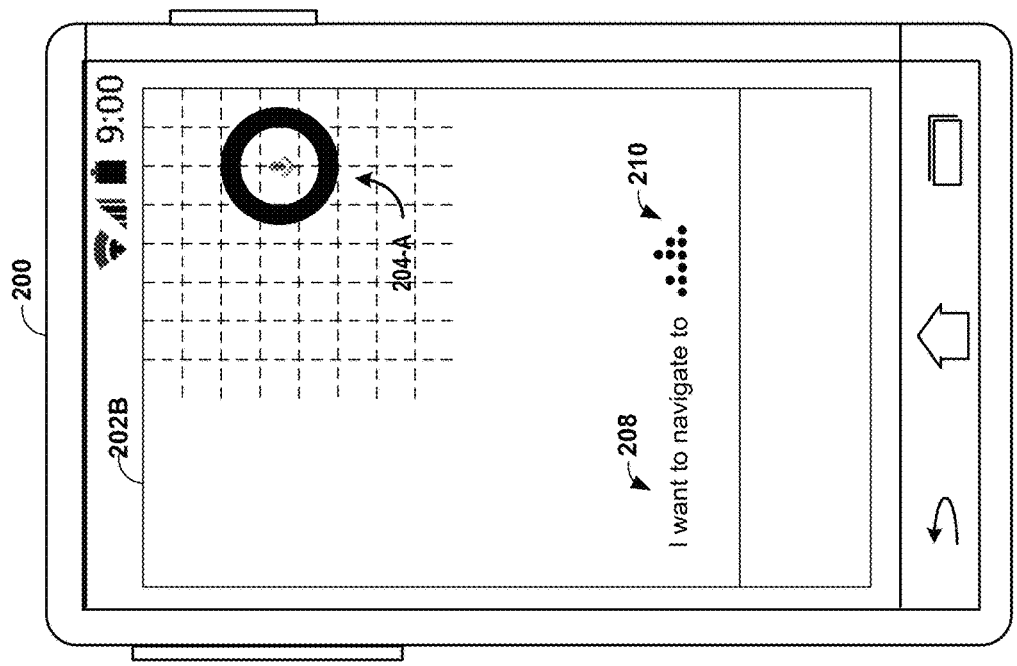
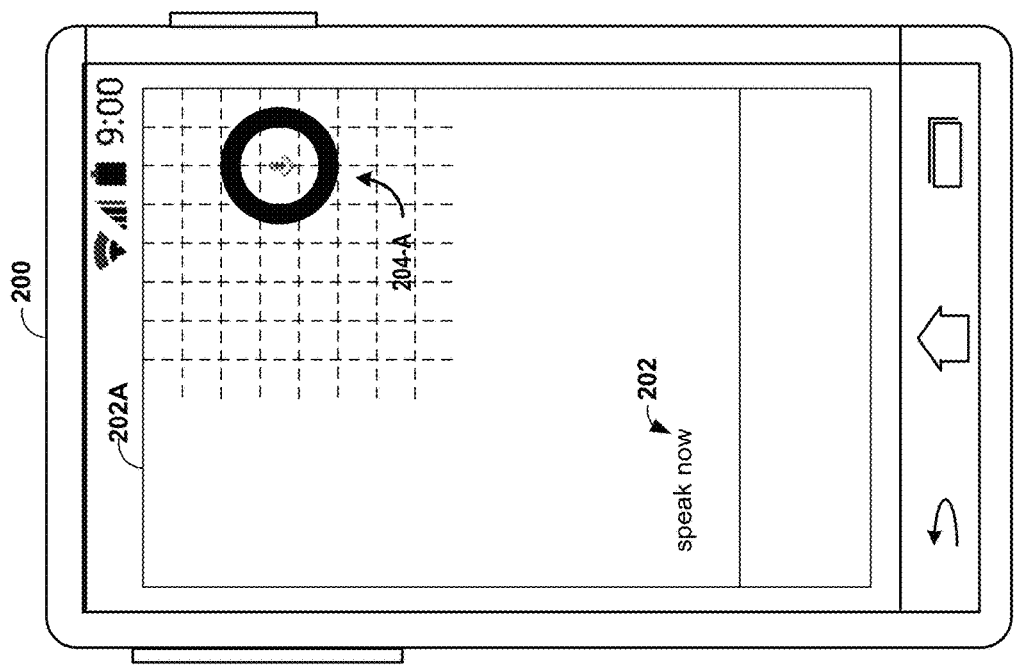

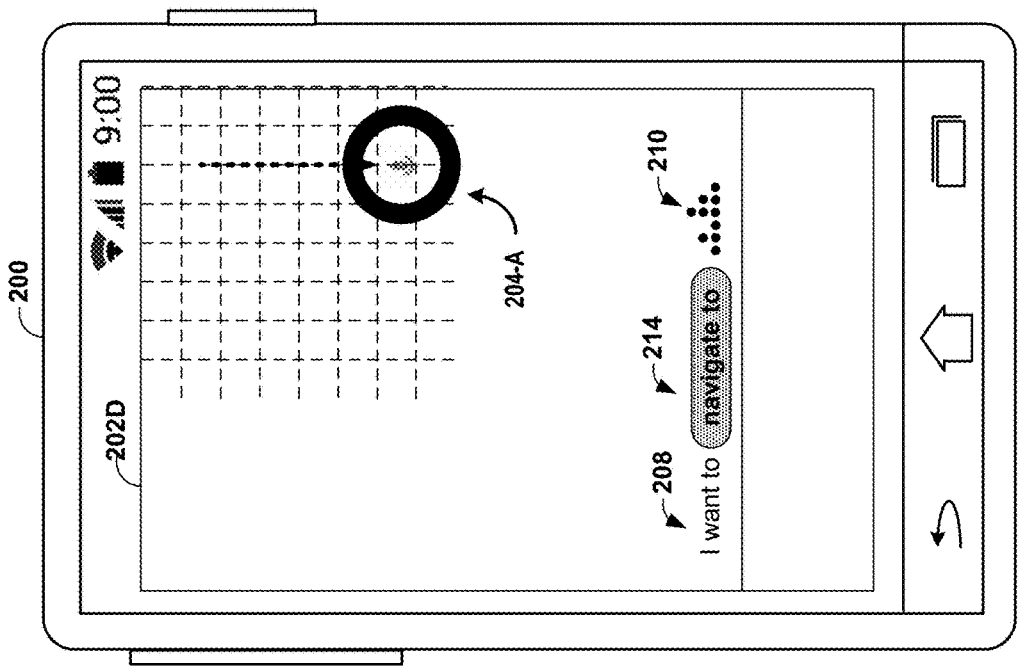
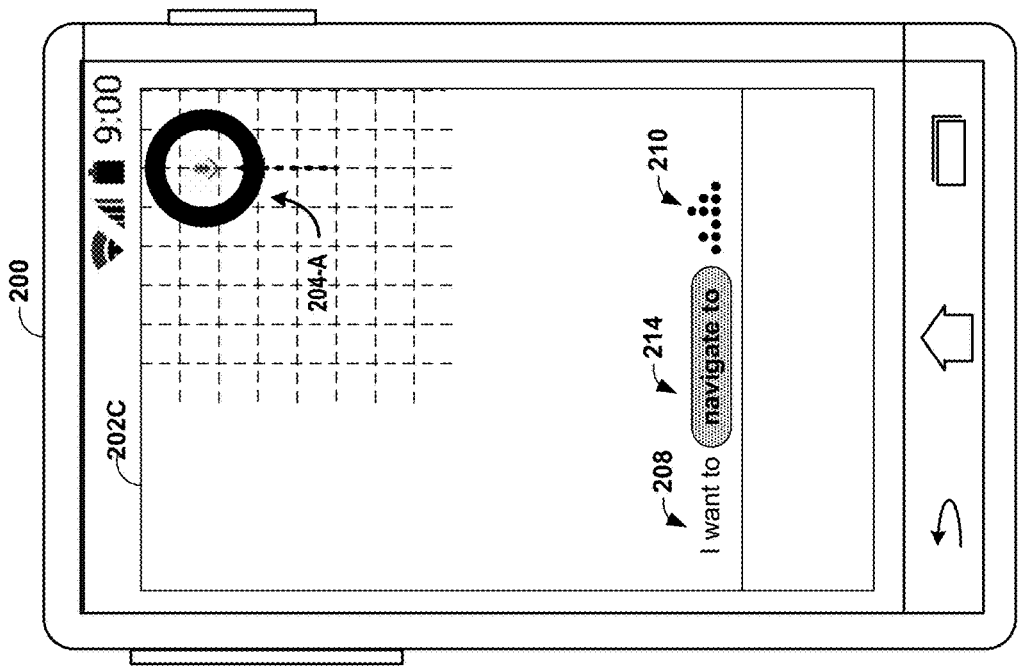

US 9,990,177 B2

VISUAL INDICATION OF A RECOGNIZED VOICE-INITIATED ACTION

This application is a Continuation of U.S. application Ser. No. 14/242,427, filed Apr. 1, 2014, which claims the benefit of U.S. Provisional Application No. 61/954,539, filed Mar. 17, 2014, the entire content of which is hereby incorporated by reference.

BACKGROUND

Some computing devices (e.g., mobile phones, tablet computers, wearable computing devices, personal digital assistants, etc.) are "voice-activated" and can recognize voice commands based on audio input (e.g., a user's voice). For example, a computing device may receive voice input (e.g., audio data) with a microphone. The computing device may analyze the voice input using speech-recognition techniques to determine a command (e.g., "search," "navigate," "play," "pause," "call," etc.) and then execute a voice-initiated action associated with the command (e.g., provide a search option, execute a map application, begin playing a media file, stop playing a media file, place a phone call, etc.). As such, a voice-activated computing device may provide users with the ability to operate some features of the computing device by speaking commands at the computing device.

Although hands-free computing can offer some benefits over alternative forms of input (e.g., touch), some voice-activated computing devices may be cumbersome to use. For instance, a user may be unsure whether a computing device has recognized a voice command while the user is still speaking, which may cause the user to hesitate and/or pause while providing voice input. Periods of hesitation and/or pauses in audio data may cause inaccuracies in the voice recognition techniques being performed by the voice-activated computing device, however.

SUMMARY

In one example, the disclosure is directed to a method that includes outputting, by a computing device and for display, an initial speech recognition graphical user interface (GUI) having at least one element, receiving, by the computing device, audio data, and determining, by the computing device and based on the audio data, a voice-initiated action. The method further includes, responsive to determining the voice-initiated action, outputting, by the computing device and for display, an updated speech recognition GUI having an animation of a change in a position of the at least one element to indicate that the voice-initiated action has been determined.

In another example, the disclosure is directed to a computing device that includes at least one processor, and at least one module operable by the at least one processor to output, for display, an initial speech recognition graphical user interface (GUI) having at least one element, receive audio data, and determine, based on the audio data, a voice-initiated action. The at least one module is further operable by the at least one processor to, responsive to determining the voice-initiated action, output, for display, an updated speech recognition GUI having an animation of a change in a position of the at least one element to indicate that the voice-initiated action has been determined.

In another example, the disclosure is directed to a computer-readable storage medium comprising instructions that, when executed, configure at least one processor to output, for display, an initial speech recognition graphical user interface (GUI) having at least one element, receive audio data, and determine, based on the audio data, a voice-initiated action. The computer-readable storage medium comprises further instructions that, when executed, configure the at least one processor to, responsive to determining the voice-initiated action, output, for display, an updated speech recognition GUI having an animation of a change in a position of the at least one element to indicate that the voice-initiated action has been determined.

BRIEF DESCRIPTION OF DRAWINGS

FIGS. 4A-4H are conceptual diagrams illustrating example speech recognition graphical user interfaces having visual indications of a recognized voice-initiated action, in accordance with one or more techniques of the present disclosure.

DETAILED DESCRIPTION

In general, techniques of this disclosure may enable a computing device to provide a visual confirmation that the computing device has recognized a voice command for performing a voice-initiated action based on audio data (e.g., a voice input). The computing device may receive audio data as a user of the computing device speaks into a microphone of the computing device. As the audio data is received, the computing device may output, for display, a speech recognition graphical user interface (GUI) that conveys visual information (e.g., visual feedback) related to the audio data. For example, prior to recognizing a voice command based on the audio data, the computing device may present a graphical element within the speech recognition GUI to visually indicate that the audio data is being received. The graphical element may be, for example, one or more graphical icons, images, words of text (based on, e.g., a transcription of the received audio data), or any combination thereof. In some examples, the graphical element may be an interactive user interface graphical element.

In any event, the computing device may perform speech-recognition techniques to analyze the audio data and determine one or more voice commands for causing the computing device to perform voice-initiated actions. To indicate that a voice command has been determined from the audio data, the computing device may output an updated speech recognition GUI that includes an observable animation of the graphical element that was displayed within the speech recognition GUI, prior to the determination of the voice command. The animation of the graphical element may include an observable change in a position of the graphical element within the speech recognition GUI. The observable change in position of the graphical element may provide a visual confirmation that the computing device has recognized a voice-initiated action.

For instance, when the computing device determines, based on the audio data, a voice-initiated action, the computing device may cause the graphical element to move up-and-down within the speech recognition GUI to mimic a person nodding his or her head as an indication of an affirmative response. In some examples, if the computing device does not determine any voice-initiated actions based on the audio data, the graphical element may appear to move side-to-side within the speech recognition GUI to mimic a negative response that a person provides when shaking his or her head.

By presenting an animated graphical element as a visual confirmation that the voice command was received, the computing device may prevent the user from pausing and/or hesitating while providing a voice input. The computing device may enable a user to speak more naturally while providing voice commands and may provide the user with an easier and faster way to determine whether the computing device has correctly identified a voice-initiated action.

Figure 1:
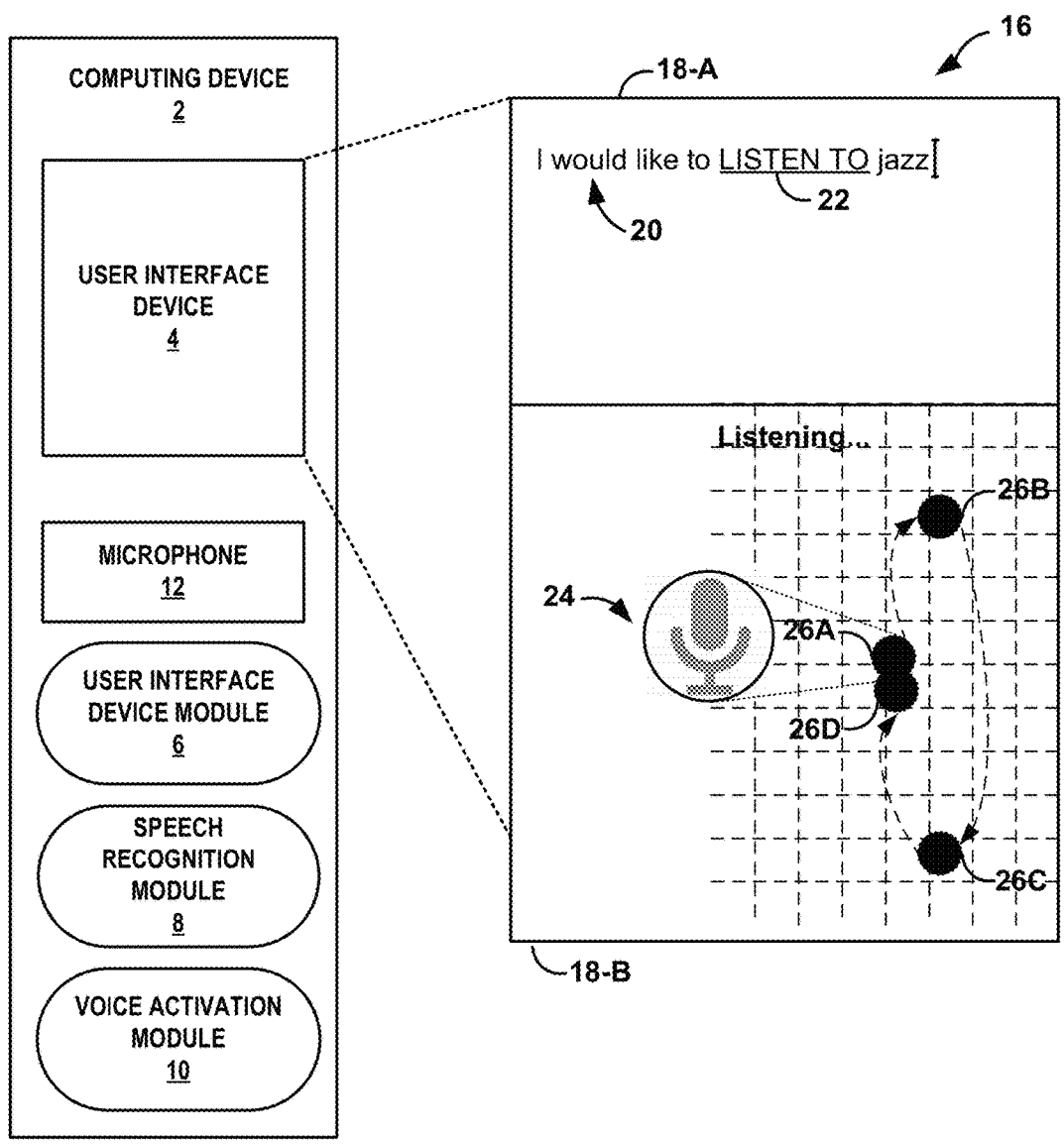
FIG. 1 is a conceptual diagram illustrating an example computing device that is configured to provide a speech recognition graphical user interface having a visual indication of a recognized voice-initiated action, in accordance with one or more aspects of the present disclosure.

FIG. 1 is a conceptual diagram illustrating example computing device 2 that is configured to provide speech recognition graphical user interface 16 having a visual indication of a recognized voice-initiated action, in accordance with one or more aspects of the present disclosure. In the example of FIG. 1, computing device 2 represents any type of computing device that can receive audio data as input and output, for display, graphical information based on the audio data. For example, computing device 2 may be a mobile computing device such as a mobile phone, a tablet computer, a personal digital assistant (PDA), a laptop computer, a portable gaming device, a portable media player, a Global Positioning System (GPS) device, an e-book reader, a wearable computing device, computerized eye wear, a computerized watch, an automobile navigation system, etc. In some examples, computing device 2 may be a stationary computing device, such as a desktop computer, a mainframe computer, a server computer, a television platform, or another type of computing device.

As shown in FIG. 1, computing device 2 includes a user interface device (UID) 4. UID 4 of computing device 2 may function as an input device and/or as an output device for computing device 2. UID 4 may be implemented using various technologies. For instance, UID 4 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 4 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of computing device 2.

UID 4 of computing device 2 may include a presence-sensitive display that may receive tactile input from a user of computing device 2. UID 4 may receive indications of the tactile input by detecting one or more gestures from a user of computing device 2 (e.g., the user touching or pointing to one or more locations of UID 4 with a finger or a stylus pen). UID 4 may present output to a user, for instance at a presence-sensitive display. UID 4 may present the output as a graphical user interface (e.g., user interface 16) which may be associated with functionality provided by computing device 2. For example, UID 4 may present various user interfaces of applications executing at or accessible by computing device 2 (e.g., an electronic message application, a navigation application, an Internet browser application, a media player application, etc.). A user may interact with a respective user interface of an application to cause computing device 2 to perform operations relating to a function.

Computing device 2 also includes microphone 12. Microphone 12 may be one of one or more input devices of computing device 2. Microphone 12 is a device for receiving auditory input, such as audio data. Microphone 12 may receive audio data that includes speech from a user. Microphone 12 detects audio and provides related audio data to other components of computing device 2 for processing. Computing device 2 may include other input devices in addition to microphone 12.

Computing device 2 includes user interface device (UI) module 6, speech recognition module 8, and voice activation module 10. Modules 6, 8, and 10 may perform operations described using software, hardware, firmware, or a mixture of hardware, software, and firmware residing in and executing on computing device 2. Computing device 2 may execute modules 6, 8, and 10 with multiple processors. Computing device 2 may execute modules 6, 8, and 10 as a virtual machine executing on underlying hardware. Modules 6, 8, and 10 may execute as one or more services of an operating system, a computing platform. Modules 6, 8, and 10 may execute as one or more remote computing services, such as one or more services provided by a cloud and/or cluster based computing system. Modules 6, 8, and 10 may execute as one or more executable programs at an application layer of a computing platform.

Speech recognition module 8 of computing device 2 may receive one or more indications of audio input (e.g., audio data) from microphone 12 and analyze the indications of audio input or audio data using speech recognition techniques to identify portions of speech (e.g., spoken word) associated with the audio data. Speech recognition module 8 may transcribe speech associated with the audio data into text data (e.g., one or more indications of textual characters or words) that speech recognition module 8 provides to UI device module 6. As is described in further detail below, UI device module 6 may instruct UID 4 to output, for display at UID 4, text based on the text data received from speech recognition module 6, such as non-command text 20 of user interface 16.

Voice activation module 10 of computing device 2 may receive text data from speech recognition module 8 after speech recognition module 8 transcribes speech from audio data detected at microphone 12. Voice activation module 10 may analyze transcribed text data to determine if the text data includes one or more words or groups of words that match one or more keywords or groups of keywords that make up a command or phrase that activates a voice-initiated action. As described below in more detail, once voice activation module 10 identifies a keyword word or phrase that corresponds to a voice-initiated action, voice activation module 10 may output the keyword or phrase to UI module 20 which may cause UI module 20 to command UID 4 to present, within a speech recognition user interface an animation of a change in position of a graphical element to indicate that a voice-initiated action has been determined from received audio data.

UI module 6 may cause UID 4 to present a graphical user interface (GUI) as output and interpret input detected at UID 4 as a user of computing device 2 interacts with the GUI being displayed at UID 4. For example, UI module 6 may cause UID 4 to output speech recognition graphical user interface 16 (referred to simply as "user interface 16"). A user may provide input (e.g., one or more tap or non-tap gestures, etc.) at or near locations of UID 4 that correspond to locations of user interface 16 at which one or more graphical elements are being displayed as the user interacts with user interface 16 to command computing device 2 to perform a function. UI module 6 may interpret the input detected at UID 4 and forward one or more indications of the input (e.g., input data) to modules 8 and 10 to cause computing device 2 to perform a function associated with the input.

Throughout the disclosure, examples are described where a computing device and/or a computing system may analyze information (e.g., audio data, voice input, locations, speeds, calendars, communications, etc.) associated with the computing device and/or the computing system only if the computing device and/or the computing system receives permission from the user to analyze the information. For example, in situations discussed below in which the computing device and/or the computing system may collect or audio data based on voice input provided by a user and/or contextual information associated with a computing device, the user may be provided with an opportunity to provide input to control whether programs or features of the computing device and/or the computing system can collect and make use of that audio data and user information (e.g., information about a user's current location, current speed, etc.), or to dictate whether and/or how to the computing device may receive content that may be relevant to the user. In addition, certain data may be treated in one or more ways before it is stored or used by the computing device and/or the computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or the computing system.

FIG. 1 shows user interface 16 having one or more graphical indications or graphical elements displayed at various locations of user interface 16. Each graphical element is presented at various locations of UID 4 that correspond to the locations of user interface 16. For example, user interface 16 shows graphical element 24 as a microphone icon that, when animated, can move between positions 26A, 26B, 26C, and 26D of user interface 16.

In the example of FIG. 1, user interface 16 is bifurcated into two regions: an edit region 18-A and an action region 18-B. Edit region 18-A and action region 18-B may each include respective graphical elements such as transcribed text, images, objects, hyperlinks, characters of text, menus, fields, virtual buttons, virtual keys, etc. As used herein, any of the graphical elements listed above may be user interface elements. FIG. 1 shows just one example layout for user interface 16. In other examples, user interface 16 may have a different layout, number of regions, appearance, format, version, color scheme, or other visual characteristic then that shown in FIG. 1.

UI module 6 may cause UID 4 to present edit region 18-A at an area of UID 4 that is configured to receive input or to output information. For example, computing device 2 may receive voice input that speech recognition module 8 identifies as speech, and edit region 18-A outputs information related to the voice input. For example, as shown in FIG. 1, user interface 16 displays non-command text 20 in edit region 18-A. In other examples, edit region 18-A may update the information displayed based on touch-based or gesture-based input.

UI module 6 may cause UID 4 to present action region 18-B at an area of UID 4 that is configured to accept input from a user or to provide a graphical indication of an action that computing device 2 has taken in the past, is currently taking, or will be taking. In some examples, action region 18-B may include a graphical keyboard that includes graphical elements displayed as keys. In some examples, action region 18-B refrains from outputting a graphical keyboard for display while computing device 2 is in a speech recognition mode.

UI device module 6 may act as an intermediary between various components of computing device 2 to make determinations based on input detected by UID 4 and to generate output presented by UID 4. For example, UI module 6 may receive, as an input from voice activation module 10, information identifying graphical element 24 as corresponding to or being associated with a voice-initiated action determined by voice activation module 10 based on audio data received at microphone 12. UI module 6 may update user interface 16 to cause graphical element 24 to have an animation of a change in position of graphical element 24 such that graphical element 24 may appear to move between positions 26A, 26B, 26C, and 26D when UID 4 presents user interface 16 for display in response to computing device 2 recognizing a voice-initiated action from indications of audio input.

Positions 26A-26D (collectively "positions 26") are shown in FIG. 1 as shaded circles displayed at various locations of user interface 16 at UID 4. In some examples, positions 26 may not be displayed as shaded circles. In some examples, positions 26 represent coordinate locations at a virtual grid overlaid at UID 4 and user interface 16. Positions 26 are shown for ease of illustration to show how UI module 20 may cause an animation of graphical element 24 that causes a change in position of graphical element 24 such that graphical element 24 may appear to move between positions 26 when presented at UID 4.

UI module 6 may receive text data as input from speech recognition module 8 as speech recognition module 8 performs speech-to-text techniques on the audio data received at microphone 12. UI module 6 causes UID 4 to display the transcribed textual characters at edit region 18-A in a first visual format (e.g., particular color, size, font, etc.). For example, FIG. 1 shows that UI module 6 may cause UID 4 to present non-command test 20 as textual characters based on audio data in a first visual format.

UI module 6 may receive information identifying at least a portion of the textual characters being displayed at edit region 18-A as corresponding to command text from voice activation module 10. Based on the identifying information, UI module 6 may display the text associated with the voice command, or another graphical element, in a second, different visual format than the first visual format that the command text or graphical element was initially displayed in. For example, FIG. 1 further shows that UI module 6 may cause UID 4 to present command text 22 as textual characters based on audio data in a second visual format that is different from the first visual format associated with non-command text 20.

In accordance with techniques of this disclosure, computing device 2 may output, for display, an initial speech recognition user interface having at least one element. When computing device 2 recognizes a voice-initiated action based on received audio data, computing device 2 may output, for display, an updated speech recognition user interface having an animation of a change in position of the at least one element to indicate that the voice initiated action was recognized.

For example, a user of computing device 2 may speak at microphone 12. Responsive to detecting an indication of audio data being received by microphone 12, speech recognition module 8 and UI module 6 may cause UID 4 to present user interface 16. UI device module 6 may send information to UID 4 that includes instructions for displaying user interface 16 at a presence-sensitive display of UID 4. Until a command or voice-initiated action is recognized by voice activation module 10, UI module 6 may cause UID 4 to present user interface 16 having graphical element 24 at position 26A. This initial position of graphical element 24 within action region 18-B may visually indicate to the user that computing device 2 is detecting his or her speech and "listening" for a voice command.

In addition to presenting graphical element 24, UI module 6 may present transcribed text based on received audio input as further indication to the user that computing device 2 is detecting his or her speech. For example, speech recognition module 8 may output text data associated with a transcription of the audio data received at microphone 12 to UI module 6. UI module 6 may present the text data as one or more graphical elements at edit region 18-A. In the example of FIG. 1, the user may speak the words "I would like to listen to jazz" at microphone 12. Speech recognition module 8 and UI module 20 may cause UID 4 to present non-command text 20 in a first visual format (e.g., not capitalized, not underlined, etc.) within edit region 18-A.

Computing device 2 may determine a voice-initiated action based on the audio data. For example, while UI module 6 presents non-command text 20 at UID 4, voice activation module 10 may receive the audio data from microphone 12 and/or the text data from speech recognition module 8 and analyze the audio data and/or the text data for one or more matching keywords or phrases associated with a recognized voice command for causing computing device 2 to perform a corresponding voice-initiated action. In other words, computing device 2 may analyze the audio data and/or text data to determine a command (e.g., "search," "navigate," "play," "pause," "call," etc.) that may cause computing device 2 to execute a voice-initiated action associated with the command (e.g., provide a search option, execute a map application, begin playing a media file, stop playing a media file, place a phone call, etc.). Various examples of commands and voice-initiated actions exist. In general, a voice-initiated action represents any function of computing device 2 that can be initiated via user input.

Responsive to determining the voice-initiated action, computing device 2 may output, for display, an updated speech recognition graphical user interface having an animation of a change in a position of the at least one element to indicate that the voice-initiated action has been determined. For example, FIG. 1 shows that voice activation module 10 may output information to UI module 6 indicating the phrase regarding which of the transcribe portions of text data (e.g., the text associated with the phrase "listen to") is associated with a voice command identified by voice activation module 10.

After the command or voice-initiated action "listen to" is recognized by voice activation module 10, UI module 6 may cause UID 4 to present user interface 16 having an animation of a change in position of graphical element 24. In other words, UI module 6 may cause graphical element 24 to transition from initial position 26A, to position 26B located above position 26A, to position 26C located below initial positions 26A and 26B, and then to position 26D located at or very near initial position 26A. The animation of the change in the position of graphical element 24 may appear similar to a person nodding his or her head as an affirmative gesture. This type of animation may indicate to the user of computing device 2 that a voice command or voice-initiated action has been recognized and determined by computing device 2.

In some examples, while receiving additional audio data, computing device 2 may output, for display, the updated speech recognition graphical user interface having the animation of the change in the position of the at least one element to indicate that the voice-initiated action has been determined. In other words, microphone 12 may continue to receive audio as the user of computing device 12 speaks the word "jazz" following the words "listen to" and UI module 6 may output the text "jazz" as the additional audio data received by microphone 12 is analyzed by speech recognition module 8 and voice activation module 10. In this way, computing device 2 can provide the animation of graphical element 24 as an observable indication that the voice command or voice-initiated action was recognized, without causing the user to pause or hesitate while providing the voice input.

In some examples, to further indicate that computing device 2 recognized a command from the audio data, UI module 6 may update the presentation of non-command text 20 to include an indication of command text 22. In other words, prior to voice activation module 10 determining that the command "listen to" was spoken by a user, UI module 6 may cause UID 4 to present the text "I would like to listen to" at edit region 18-A in a non-underlined, and non-capitalized format. After UI module 6 receives information from voice activation module 10 about the recognized voice command "listen to", UI module 20 may update the presentation of user interface 16 to present command text 20 (e.g., the words "listen to") in a capitalized and underlined format.

In this manner, techniques of this disclosure may enable a computing device to present an animated graphical element as a visual confirmation that a voice command was received. Presenting an animated graphical element in this way may prevent a user from pausing and/or hesitating while providing a voice input. The computing device may enable a user to speak more naturally while providing voice commands and may provide the user with an easier and faster way to determine whether the computing device has correctly identified a voice-initiated action. By providing a visual indication of a recognized voice-initiated action, the computing device may improve overall user satisfaction with speech-recognition features. The techniques described may improve a user's experience with voice control of a computing device configured according to the various techniques of this disclosure.

Throughout the disclosure, examples are described where a computing device and/or a computing system may analyze information (e.g., audio data, voice input, locations, speeds, calendars, communications, etc.) associated with the computing device and/or the computing system only if the computing device and/or the computing system receives permission from the user to analyze the information. For example, in situations discussed below in which the computing device and/or the computing system may collect or audio data based on voice input provided by a user and/or contextual information associated with a computing device, the user may be provided with an opportunity to provide input to control whether programs or features of the computing device and/or the computing system can collect and make use of that audio data and user information (e.g., information about a user's current location, current speed, etc.), or to dictate whether and/or how to the computing device may receive content that may be relevant to the user. In addition, certain data may be treated in one or more ways before it is stored or used by the computing device and/or the computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or the computing system.

Figure 2:
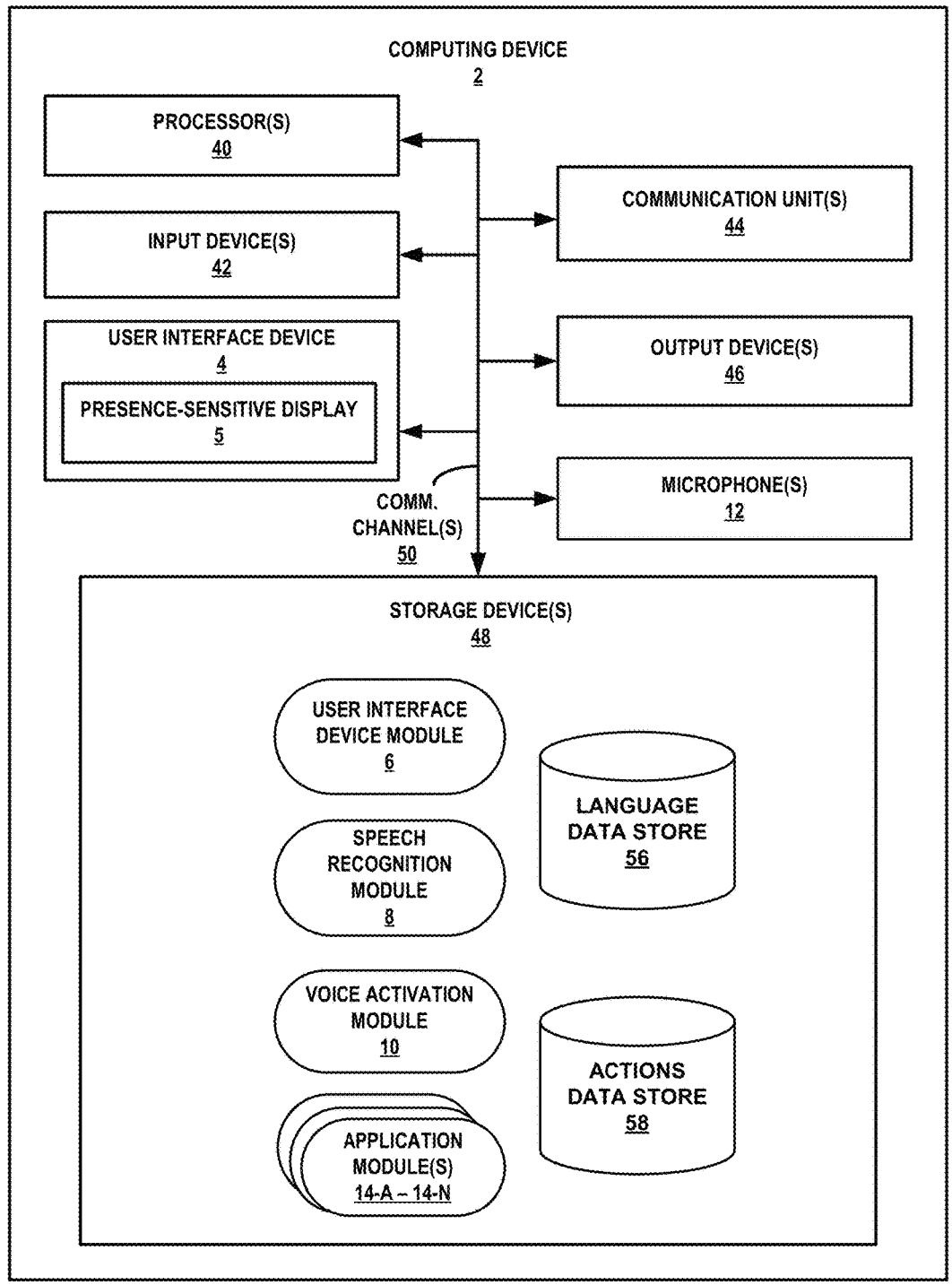
FIG. 2 is a block diagram illustrating an example computing device for providing a speech recognition graphical user interface having a visual indication of a recognized voice-initiated action, in accordance with one or more aspects of the present disclosure.

FIG. 2 is a block diagram illustrating computing device 2 for providing a speech recognition graphical user interface having a visual indication of a recognized voice-initiated action, in accordance with one or more aspects of the present disclosure. Computing device 2 of FIG. 2 is described below within the context of FIG. 1. FIG. 2 illustrates only one particular example of computing device 2, and many other examples of computing device 2 may be used in other instances. Other examples of computing device 2 may include a subset of the components included in example computing device 2 or may include additional components not shown in FIG. 2.

As shown in the example of FIG. 2, computing device 2 includes user interface device (UID) 4, one or more processors 40, one or more input devices 42, one or more microphones 12, one or more communication units 44, one or more output devices 46, and one or more storage devices 48. Storage devices 48 of computing device 2 also include UID module 6, speech recognition module 8, voice activation module 10, application modules 14A-14N (collectively referred to as "application modules 14"), language data store 56, and actions data store 58. One or more communication channels 50 may interconnect each of the components 4, 6, 8, 10, 14, 40, 42, 44, 46, 48, 56, and 58 for inter-component communications (physically, communicatively, and/or operatively). In some examples, communication channels 50 may include a system bus, a network connection, an inter-process communication data structure, or any other technique for communicating data.

One or more input devices 42 of computing device 2 may receive input. Examples of input are tactile, motion, audio, and video input. Input devices 42 of computing device 2, in one example, includes a presence-sensitive display 5, touch-sensitive screen, mouse, keyboard, voice responsive system, video camera, microphone (such as microphone 12), or any other type of device for detecting input from a human or machine.

One or more output devices 46 of computing device 2 may generate output. Examples of output are tactile, audio, electromagnetic, and video output. Output devices 46 of computing device 2, in one example, includes a presence-sensitive display, speaker, cathode ray tube (CRT) monitor, liquid crystal display (LCD), motor, actuator, electromagnet, piezoelectric sensor, or any other type of device for generating output to a human or machine. Output devices 46 may utilize one or more of a sound card or video graphics adapter card to produce auditory or visual output, respectively.

One or more communication units 44 of computing device 2 may communicate with external devices via one or more networks by transmitting and/or receiving network signals on the one or more networks. Communication units 44 may connect to any public or private communication network. For example, computing device 2 may use communication unit 44 to transmit and/or receive radio signals on a radio network such as a cellular radio network. Likewise, communication units 44 may transmit and/or receive satellite signals on a Global Navigation Satellite System (GNNS) network such as the Global Positioning System (GPS). Examples of communication unit 44 include a network interface card (e.g., an Ethernet card), an optical transceiver, a radio frequency transceiver, a GPS receiver, or any other type of device that can send or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include presence-sensitive display 5. In some examples, presence-sensitive display 5 may detect an object at and/or near presence-sensitive display 5. As one example, presence-sensitive display 5 may detect an object, such as a finger or stylus that is within six centimeters or less of presence-sensitive display 5. Presence-sensitive display 5 may determine a location (e.g., an (x,y) coordinate) of presence-sensitive display 5 at which the object was detected. In another example, presence-sensitive display 5 may detect an object fifteen centimeters or less from the presence-sensitive display 5 and other ranges are also possible. The presence-sensitive display 5 may determine the location of the screen selected by a user's finger using capacitive, inductive, and/or optical recognition techniques. In some examples, presence sensitive display 5 provides output to a user using tactile, audio, or video stimuli as described with respect to output device 46. In the example of FIG. 2, UID 4 presents a user interface (such as user interface 16 of FIG. 1) at presence-sensitive display 5 of UID 4.

While illustrated as an internal component of computing device 2, UID 4 also represents an external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2 (e.g., computing device 2 may store data in language data stores 56 and actions data stores 58 accessed by speech recognition module 8 and voice activation module 10 during execution at computing device 2). In some examples, storage device 48 functions as a temporary memory, meaning that storage device 48 is not used for long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, 10, and 14.

One or more processors 40 may implement functionality and/or execute instructions within computing device 2. For example, processors 40 on computing device 2 may receive and execute instructions stored by storage devices 48 that execute the functionality of UID module 6, speech recognition module 8, voice activation module 10, and application modules 14. These instructions executed by processors 40 may cause computing device 2 to store information within storage devices 48 during program execution. Processors 40 may execute instructions in modules 6, 8, and 10 to cause UID 4 to display user interface 16 with a graphical element that has a visual format different from a previous visual format upon computing device 2 identifying a voice-initiated action. That is, modules 6, 8, and 10 may be operable by processors 40 to perform various actions, including transcribing received audio data, analyzing the audio data for voice-initiated actions, and updating presence-sensitive display 5 of UID 4 to present a graphical element having an animation of a change in position and/or a graphical element having a change in a visual format of the graphical element associated with the voice-initiated action. Further, UID module 6 may be operable by processors 40 to perform various actions, including receiving an indication of a gesture at locations of presence-sensitive display 5 of UID 4 and causing UID 4 to present user interface 14 at presence-sensitive display 5 of UID 4.

In accordance with aspects of this disclosure, computing device 2 of FIG. 2 may output, at UID 4, an initial speech recognition graphical user interface having at least one element. For example, microphone 12 of computing device 2 may receive audio data as a user speaks at microphone 12 to provide voice commands or otherwise initiate an action through his or her voice. Prior to performing a voice-initiated action based on the audio data and while receiving additional audio data (e.g., audio data received prior to data associated with a voice-initiated action and/or subsequent to the data associated with the voice-initiated action) UI module 6 may cause UID 4 to output an initial representation of user interface 16 of FIG. 1. After UI module 20 receives information from voice activation module 10 that indicates a recognized voice-initiated action based on the received audio data, UI module 20 may cause UID 4 to present an updated speech recognition GUI. For example, UI module 20 may cause UID 4 to present graphical element 24 with an animation having a change in position to indicate that the voice-initiated action associated with the audio data was determined.

Speech recognition module 8 of computing device 2 may receive, from microphone 12, for example, one or more indications of audio data detected at microphone 12. Generally, microphone 12 may provide received audio data or an indication of audio data, speech recognition module 8 may receive the audio data from microphone 12. Speech recognition module 8 may determine if the information corresponding to the audio data received from microphone 12 includes speech. Using speech recognition techniques, speech recognition module 8 may transcribe the audio data. Speech recognition module 8 may use language data store 6 to transcribe the audio data if the audio data does include speech.

Speech recognition module 8 may also determine if the audio data includes the voice of a particular user. In some examples, if the audio data corresponds to a human voice, speech recognition module 8 determines if the voice belongs to a previous user of computing device 2. If the voice in the audio data does belong to a previous user, speech recognition module 8 may modify the speech recognition techniques based on certain characteristics of the user's speech. These characteristics may include tone, accent, rhythm, flow, articulation, pitch, resonance, or other characteristics of speech. Taking into considerations known characteristics about the user's speech, speech recognition module 8 may improve results in transcribing the audio data for that user.

In examples where computing device 2 has more than one user that uses speech recognition, computing device 2 may have profiles for each user. Speech recognition module 8 may update a profile for a user, responsive to receiving additional voice input from that user, in order to improve speech recognition for the user in the future. That is, speech recognition module 8 may adapt to particular characteristics of each user of computing device 2. Speech recognition module 8 may adapt to each user by using machine learning techniques. These voice recognition features of speech recognition module 8 can be optional for each user of computing device 2. For example, computing device 2 may have to receive an indication that a user opts-into the adaptable speech recognition before speech recognition module 8 may store, analyze, or otherwise process information related to the particular characteristics of the user's speech.

In some examples, speech recognition module 8 transcribes the speech in the audio data that speech recognition module 8 received, directly or indirectly, from microphone 12. Speech recognition module 8 may provide text data related to the transcribed speech to UI device 4. For example, speech recognition module 8 provides the characters of the transcribed text to UI device 4. UI device 4 may output, for display, the text related to the transcribed speech that is identified in the information related to the transcribed speech at user interface 16.

Voice activation module 10 of computing device 2 may receive, from speech recognition module 8, for example, textual characters of transcribed speech from audio data detected at microphone 12. Voice activation module 10 may analyze the transcribed text or the audio data to determine if it includes a keyword or phrase that activates a voice-initiated action. In some examples, voice activation module 10 compares words or phrases from the audio data to a list of actions that can be triggered by voice activation. For example, the list of actions may be a list of verbs, such as run, play, close, open, start, email, or the like. Voice activation module 10 may use actions data store 58 to determine if a word or phrase corresponds to an action. That is, voice activation module 10 may compare words or phrases from the audio data to actions data store 58. Actions data store 58 may contain data of words or phrases that are associated with an action.

Once voice activation module 10 identifies a word or phrase that activates a voice-initiated action, voice activation module 10 causes UI module 6 and UID 4 to display, within user interface 16 a graphical element having an animation of a change in position to indicate that a voice-initiated action has been successfully recognized. For example, when voice activation module 10 determines a word in the transcribed text corresponds to a voice-initiated action, UID 4 changes output of the word from a first visual format (which may have been the same visual format as that of the rest of the transcribed text) into a second, different visual format. For example, the keywords or phrases related to the voice-initiated action are immediately, or approximately immediately, stylized differently in display of the transcription to indicate computing device 2 recognizes the voice-initiated action. In another example, an icon or other image morphs from one visual format to another visual format, which may be based on the identified voice-initiated action, when computing device 2 identifies the voice-initiated action.

In other words, speech recognition module 8 may determine a transcription based on the audio data received by microphone 12 and voice activation module 10 may identifying one or more words of the transcription that are associated with a voice-initiated action. In some examples, the graphical element that has an animation to indicate the recognized voice-initiated action may further include at least a portion of the one or more words identified by speech recognition module 8.

In some examples, voice activation module 10 may determine a voice-initiated action by determining, based at least in part on a comparison of a word or a phrase of a transcription based on the audio data to a preconfigured set of actions, the voice-initiated action. In other words, voice activation module 10 may compare and "look-up" portions of text data transcribed by speech recognition module 8 from within actions data store 58 to identify any stored voice initiated actions that match the portions of text data.

In some examples, voice activation module 10 may identifying at least one verb in the transcription, and compare the at least one verb to one or more verbs from a set of verbs, each verb in the set of verbs corresponding to at least one action from a plurality of actions including the voice-initiated action. In other words, speech recognition module 8 and/or voice activation module 10 may parse the transcribed text based on received audio data for action words, phrases, or other types of words that computing device 2 may use as a voice command. Once a verb has been identified from the audio data, voice activation module 10 may perform a look-up of the verb from within actions data store 58. If actions data store 58 returns a voice-initiated action associated with the verb search, voice activation module 10 may output information to UI module 6 to cause UID 4 to present an animation of graphical element 24 to signify that the verb and corresponding voice-initiated action was recognized.

Computing device 2 may further include one or more application modules 14-A through 14-N. Application modules 14 may include any other application that computing device 2 may execute in addition to the other modules specifically described in this disclosure. For example, application modules 14 may include a web browser, a media player, a file system, a map or navigation program, or any other number of applications or features that computing device 2 may include.

Techniques described herein may enable a computing device to improve a user's experience when using voice commands to control the computing device. For example, techniques of this disclosure may enable a computing device to output an observable indication that the computing device has accurately identified a voice-initiated action without distracting the user from providing additional voice input. In other words, a subtle animation of a change in position to a graphical element of a speech recognition GUI may serve a dual purpose of indicating to a user that a voice-initiated action was determined by the computing device, while also serving to encourage and not inhibit the user to continue to provide voice input. By providing the observable animation of the change in the position of the graphical element in this way, the computing device may provide a user with increased confidence that the computing device is correctly interpreting his or her commands and will implement or is implementing the correct voice-initiated action.

Techniques described herein may further enable computing device 2 to provide a user with an option to confirm whether computing device 2 correctly determined an action using the audio data. In some examples, computing device 2 may cancel the action if it receives an indication that it did not correctly determine the action. In another example, computing device 2 perform the voice-initiated action only upon receiving an indication that computing device 2 correctly determined the action. Techniques described herein may improve the performance and overall ease of use of computing device 2.

When providing a voice input, a user of a computing device may not know when the computing device has understood the command and may hesitate, which may reduce the accuracy of the voice command and result in a subpar user experience. In some examples, the techniques of this disclosure may enable a computing device to provide a visual indication that the computing device recognized an action associated with a voice command provided by a user. For example, when a user initiates a voice recognition feature of a mobile platform, an icon may appear at a screen that includes a circle with a microphone in the middle of it. As the user talks, the icon may not change appearance. However, once the computing device either recognizes a verb (action) in the voice command and/or when the user is done speaking, the icon may "nod" by bouncing vertically one or more times. The nod may be indicative of a human head nodding in affirmation of the user's voice input.

In some examples, the vertical bounce may be combined with a change in the icon from a microphone to an icon associated with the recognized action. For example, if the recognized action is play music, the icon may change from a microphone into a play button. In some examples, rather than a "nod" motion, the icon may move side-to-side, in a circle, or perform any other movement to indicate that the computing device recognizes the verb/action. In some examples, rather than having the icon "nod" when the action is recognized, a computing device may cause a change to another aspect of a speech recognition GUI to indicate that the computing device recognized the action, such as changing a background color, changing the appearance of text associated with the voice command, changing an icon to indicate the recognized voice command, etc.

Figure 3:
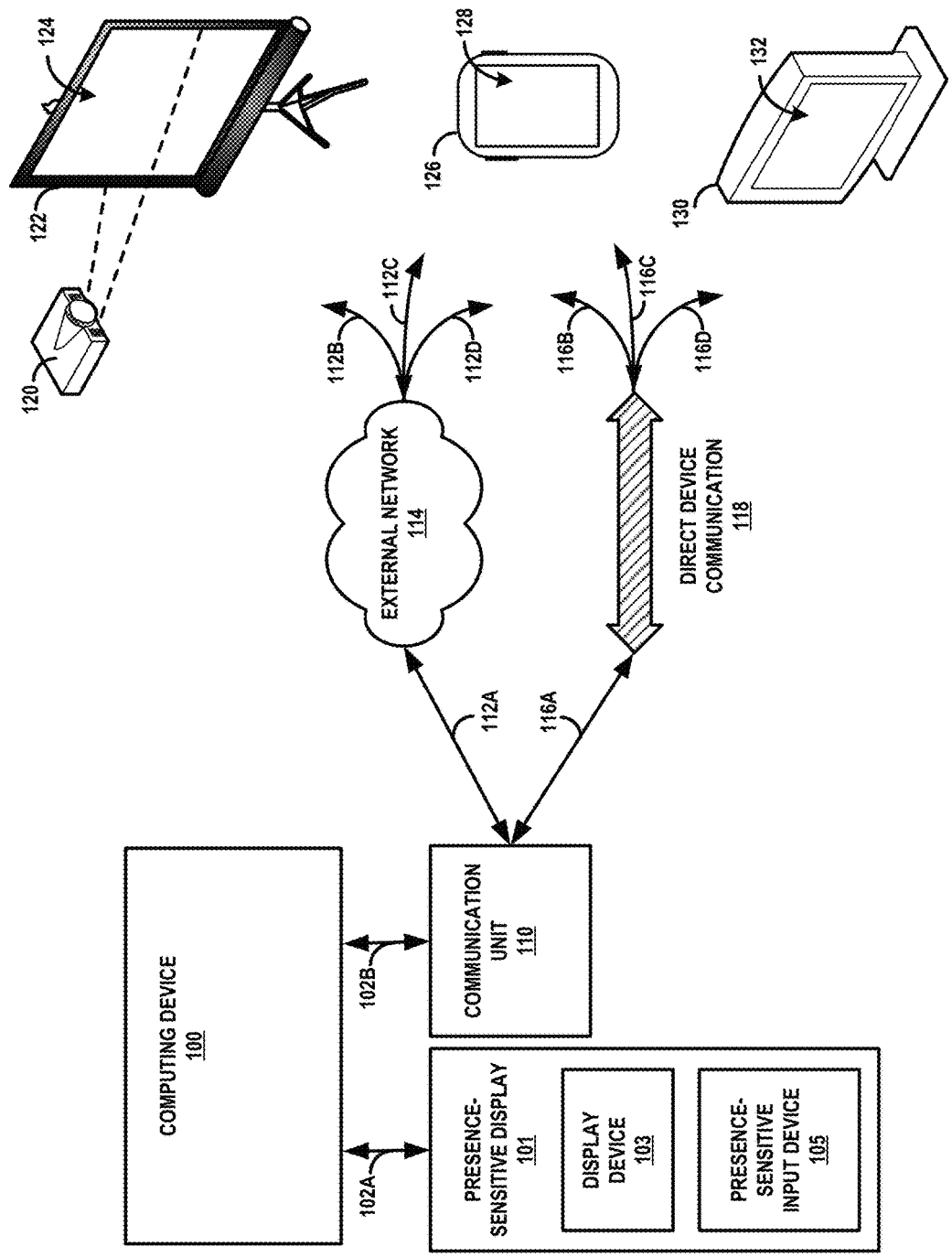
FIG. 3 is a block diagram illustrating an example computing device that outputs graphical content for display at a remote device, in accordance with one or more techniques of the present disclosure.

FIG. 3 is a block diagram illustrating an example computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes computing device 100, presence-sensitive display 101, communication unit 110, projector 120, projector screen 122, mobile device 126, and visual display device 130. Although shown for purposes of example in FIGS. 1 and 2 as a stand-alone computing device 2, a computing device such as computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 101, such as an example of user interface device 4 as shown in FIG. 1, may include display device 103 and presence-sensitive input device 105. Display device 103 may, for example, receive data from computing device 100 and display graphical content associated with the data. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, and the like, such as those shown in FIGS. 1 and 2.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of presence-sensitive display 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D.

In some examples, communication links 116A-116D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a gesture at presence-sensitive display 132 (e.g., at a region of presence-sensitive display 132 that outputs the graphical keyboard), visual display device 130 may send an indication of the gesture to computing device 100 using external network 114. Communication unit 110 of may receive the indication of the gesture, and send the indication to computing device 100.

In response to receiving speech included in audio data, computing device 100 may or may not transcribe the speech into text. Computing device 100 may cause one of the display devices, such as presence-sensitive input display 105, projector 120, presence-sensitive display 128, or presence-sensitive display 132 to output a graphical element indicating that audio data is being received. The graphical element may or may not include at least part of the transcribed text. Computing device 100 may determine that the audio data and/or transcribed text includes a voice-initiated action and cause one of the display devices 105, 120, 128, or 132 to output an animation of a change in position of the graphical element related to the voice-initiated action. The animation may cause the graphical element to appear to be nodding or otherwise affirming that computing device 100 has detected the voice-initiated action. Computing device 100 may perform the voice-initiated action.

FIGS. 4A-4H are conceptual diagrams illustrating example speech recognition graphical user interfaces having visual indications of a recognized voice-initiated action, in accordance with one or more techniques of the present disclosure. The computing device 200 of FIGS. 4A-4H may be any computing device as discussed above with respect to FIGS. 1-3, including a mobile computing device, a stationary computing device, and/or a wearable computing device. Furthermore, computing device 200 may be configured to include any subset of the features and techniques described herein, as well as additional features and techniques. FIGS. 4A-4H include graphical elements 204-A through 204-D (collectively referred to as "graphical element 204") that can have different visual formats.

FIG. 4A depicts computing device 200 having a graphical user interface (GUI) 202A and operating a state where computing device 200 may receive audio data. For example, a microphone, such as microphone 12 of FIGS. 1 and 2, may be initialized and able to detect audio data, including speech. GUI 202A may be a speech recognition GUI. GUI 202A includes graphical elements 202 and 204-A. Graphical element 202 is text and says "speak now," which may indicate that computing device 200 is able to receive audio data. Graphical element 204-A is an icon representing a microphone. Thus, graphical element 204-A may indicate that computing device 200 is able to perform an action of recording audio data.

FIG. 4B illustrates computing device 200 outputting GUI 202B in response to receiving audio data in FIG. 4A. GUI 202B includes graphical elements 204-A, 208, and 210. In this example, computing device 200 has transcribed received audio data, using speech recognition module 8 and language data store 56, for example. Computing device 200 may still be receiving additional audio data, as indicated by the microphone icon 204-A. The transcribed audio data is outputted as text in graphical element 208 and includes the words "I want to navigate to." Graphical element 210 may further indicate that computing device 200 may still be receiving additional audio data or that speech recognition module 8 may still be transcribing received audio data.

GUI 202B includes graphical element 208 in a first visual format. That is, graphical element 208 includes text having a particular font, size, color, position, or the like. The words "navigate to" are included as part of graphical element 208 and are presented in the first visual format. Similarly, GUI 202B includes graphical element 204-A in a first visual format. The first visual format of graphical element 204-A is an icon that includes an image of a microphone. Graphical element 204-A may indicate an action computing device 200 is performing or is going to perform.

GUI 202B includes graphical element 204-A at an initial location of GUI 202B. The initial location of GUI 202B at which graphical element 204-A is being displayed may correspond to a primary location of GUI 202B at which graphical element 204-A is primarily or more often displayed when computing device 200 receives audio data.

Figure 4E:
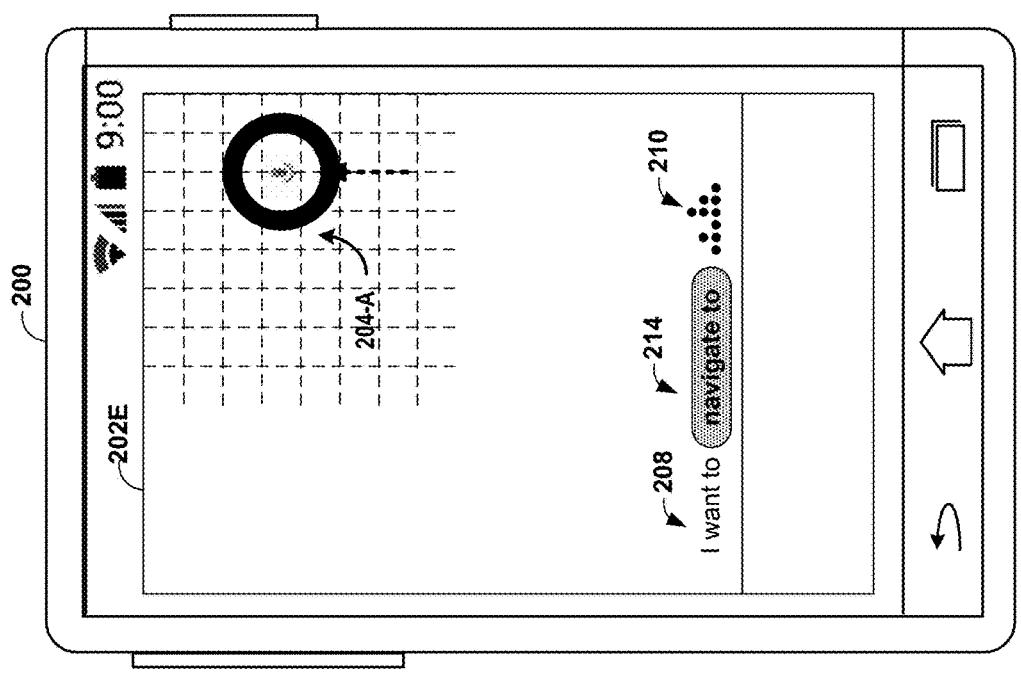

FIGS. 4C-4E depicts computing device 200 outputting updated GUI 202C-202E in a time ordered fashion to indicate to a user of computing device 200 that a voice-initiated action was determined based on the received audio data. For example, computing device 200 may first present updated GUI 202C including graphical element 204-A at a first position of updated GUI 202C located above the initial position of graphical element 204-A of GUIs 202A and 202B. Computing device 200 may next present updated GUI 202D including graphical element 204-A at a second position of updated GUI 202D that is located below the initial position of graphical element 204-A of GUIs 202A and 202B and below the first position of graphical element 204-A of GUI 202C. Lastly, computing device 200 may present updated GUI 202E including graphical element 204-A at an initial position of updated GUI 202E which corresponds to the initial position of graphical element 204-A of GUI 202B.

In this example, voice activation module 10 may have analyzed the transcribed audio data and identified a voice-initiated action. For example, voice activation module 10 may have compared one or more words or phrases in transcribed text shown in graphical element 208 to an actions data store 58. In this example, voice activation module 10 determined that the phrase "navigate to" corresponded to a voice-initiated action instruction. In response to detecting the action instruction, voice activation module 10 may have instructed UID module 6 to output updated GUIs 202C-202E, at for example, presence-sensitive display 5. Updated GUIs 202C-202E have an animation of graphical element 204-A to indicate that the voice-initiated action was recognized by computing device 200 from the audio data associated with the user's speech.

In other words, FIGS. 4B-4E show that after outputting graphical element 204-A for display at a first location of GUI 202-C, computing device 200 may output graphical element 204-A, for display, at a second location of GUI 202-D. Then, after outputting graphical element 204-A for display at the second location of GUI 202-D, computing device 200 may output graphical element 204-A for display at the initial location of GUI 202-B and GUI 202-E. FIGS. 4B-4E show that the first location of GUI 202-C is above the initial location of GUI 202-B and the second location of GUI 202-D is below the first location of GUI 202-C and the initial location of GUIs 202-B and GUI 202-E.

Although shown as a "nod" type animation in FIGS. 4B-4D, in some examples, the animation of the change in the position of graphical element 204-A depicted in FIGS. 4B-4D may include a bounce animation, a shake animation, a fold animation, and a crinkle animation, a rotation animation, a zoom animation, and a morph of shape animation. In other words, graphical element 204-A may appear to bounce-up and down one or more times, shake in various directions, fold or bow, crinkle like paper, rotate about one or more axis, zoom-in and/or zoom-out, and/or change from one shape to another shape. Various other animations may be used to indicate the change in position of graphical element 204-A and the affirmation that a voice-initiated action was detected by computing device 200.

In some examples, as computing device 200 outputs each updated GUI 202B-202E for display, computing device 200 may cease outputting an initial one of GUIs 202B-202E before outputting the next one of GUIs 202B-202E to replace the initial one of GUIs 202B-202E. Said differently, to present updated GUIs 202C-202E, computing device 200 may cease outputting, for display, GUI 202B, and after ceasing to output GUI 202B, for display, computing device 200 may output GUIS 202C-202E, in sequential order, to replace GUI 202B. In some examples, ceasing to output a first GUI prior to outputting a second GUI to replace the first GUI may be undetectable by a person viewing the screen at which computing device 200 presents each GUI.

Figure 4G:
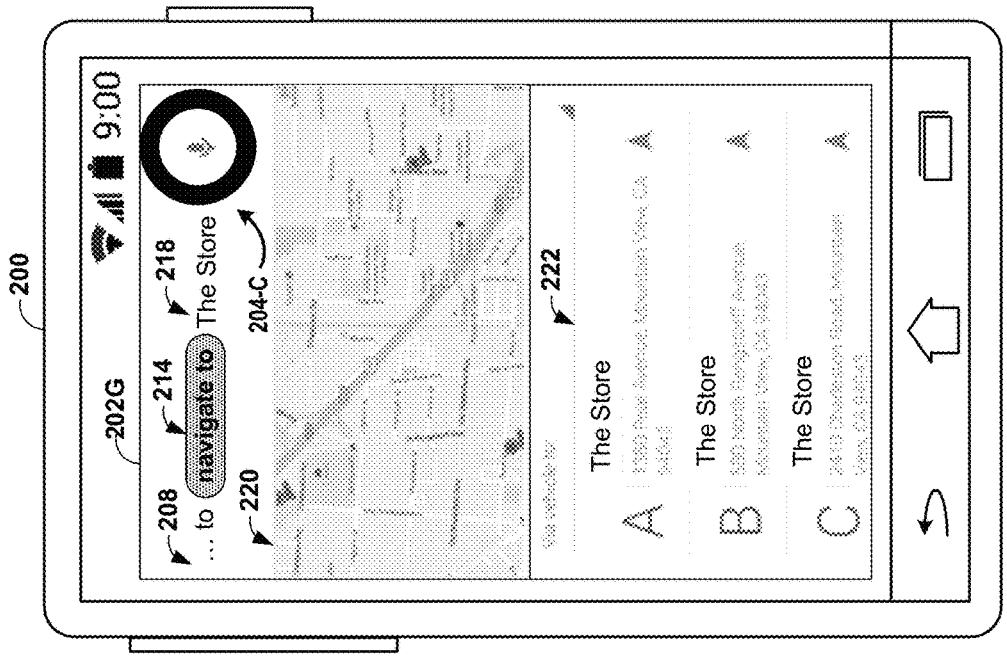
Figure 4F:
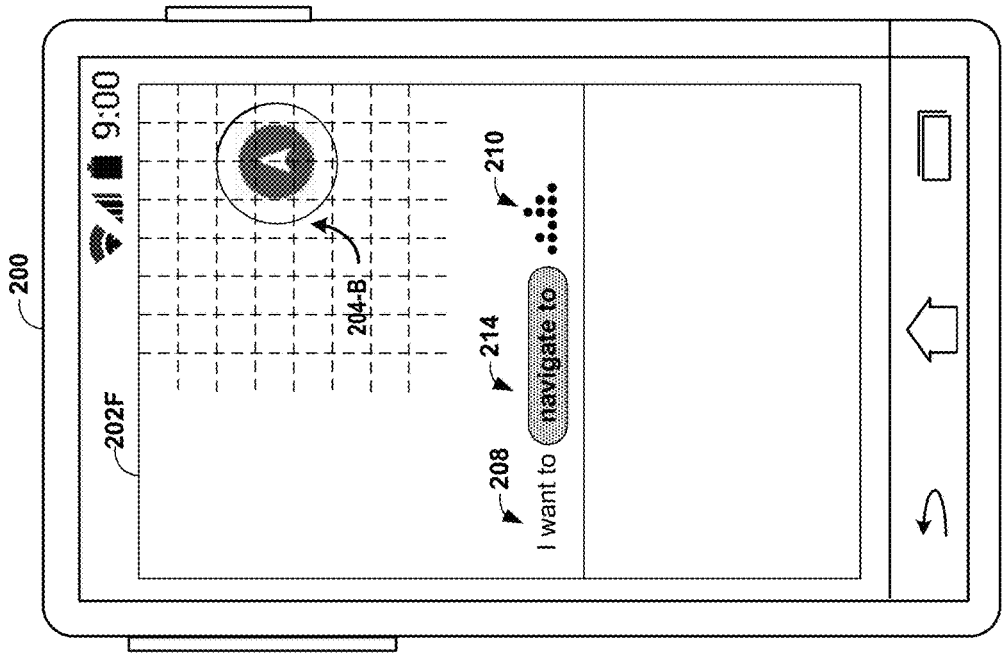

FIG. 4F depicts computing device 200 outputting an updated GUI 202F. Updated GUI 202F includes graphical elements 204-B, 208, 210, and 214. In this example, voice activation module 10 may have analyzed the transcribed audio data and identified a voice-initiated action. For example, voice activation module 10 may have compared one or more words or phrases in transcribed text shown in graphical element 208 to an actions data store 58. In this example, voice activation module 10 determined that the phrase "navigate to" corresponded to a voice-initiated action instruction. In response to detecting the action instruction, voice activation module 10 may have instructed UID module 6 to output updated GUI 202F, at for example, presence-sensitive display 5.

Updated GUI 202F includes an updated graphical element 204-B having a second visual format. Graphical element 204-B is an icon that depicts an image of an arrow, which may be associated with a navigation feature of computing device 200. In contrast, graphical element 204-A is an icon that depicts a microphone. Thus, graphical element 204-B has a second visual format while graphical element 204-A has a first visual format. The icon of graphical element 204-B indicates that computing device 200 may perform a voice-initiate action, such as performing a navigation function.

Likewise, updated GUI 202F also includes an updated graphical element 214. Graphical element 214 includes the words "navigate to" having a second visual format than in GUI 202A. In GUI 202F, the second visual format of graphical element 214 includes highlighting provided by a colored or shaded shape around the words and bolding of the words. In other examples, other characteristics or visual aspects of "navigate to" may be changed from the first visual format to the second visual format, including size, color, font, style, position, or the like. Graphical element 214 provides an indication that computing device 200 has recognized a voice-initiated action in the audio data. In some examples, GUI 212 provides an additional graphical element that indicates computing device 2 needs an indication of confirmation before performing the voice-initiated action.

In some examples, computing device 200 may cause graphical element 204-A of GUI 202E to morph into graphical element 204-B when presented as part of GUI 202F. In other words, computing device 200 may present updated GUI 202F with a morph animation of the image representative of the speech recognition mode changing into the image representative of the voice-initiated action.

In FIG. 4G, computing device 200 has continued to receive and transcribe audio data since displaying GUI 202F. Computing device 200 outputs an updated GUI 202G. GUI 202G includes the graphical elements 204-C, 208, 214, 218, 220, and 222. Graphical element 204-C has retaken the first visual format, an image of a microphone, because computing device 200 has performed the voice-initiated action and is continuing to detect audio data.

Computing device 200 received and transcribed the additional phrase "The Store" in FIG. 4G. Altogether, in this example, computing device 200 has detected and transcribed the sentence "I want to navigate to The Store." Voice activation module 10 may have determined that "The Store" is a place to which the speaker (e.g., a user) wishes to navigate. Computing device 200 has performed an action the voice-initiated action identified, navigating to "The Store." Thus, computing device 200 has executed a navigation application and performed a search for Starbucks. In one example, computing device 200 uses contextual information to determine what the voice-initiated action is and how to perform it. For example, computing device 200 may have used a current location of computing device 200 to upon which to center the search for local Starbucks locations.

Graphical element 208 may include only part of the transcribed text in order that the graphical element representing the voice-initiated action, graphical element 214, may be included in GUI 216. GUI 216 includes a map graphical element 220 showing various location of "The Store." Graphical element 222 may include an interactive list of the locations of "The Store."

In this manner, the animation of graphical element 204-A shown in FIGS. 4A-4E and 4H, alone or in combination with graphical elements 204-B and 214 shown in FIGS. 4F and 4G, represent observable confirmations or visual indications that computing device 200 has identified or has not identified a voice-initiated action based on audio data. A computing device configured according to techniques described herein may provide a user with an improved experience of interacting with the computing device via voice commands.

Figure 4H:
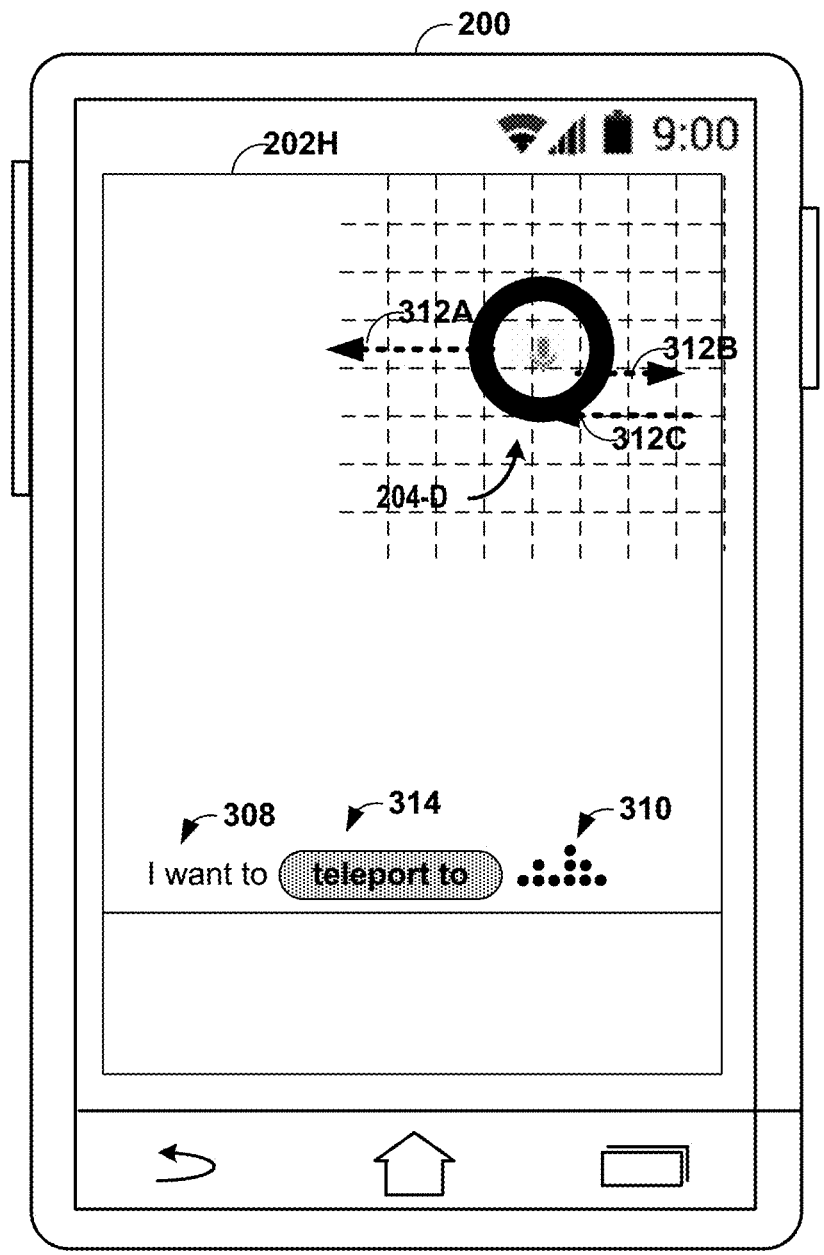

In FIG. 4H, computing device 200 has continued to receive additional audio data and transcribe the additional audio data since displaying GUIs 202A-202G. FIG. 4H shows that computing device 200 may initially output GUI 202H for display with graphical element 204-D at an initial location of GUI 202H. Computing device 200 may analyze audio data received by computing device 200 while GUI 202H is being displayed and may present graphical elements 308, 314, and 310 as visual feedback to the user of computing device 200 that the audio he or she is providing is being received.

FIG. 4H shows that with graphical element 314, computing device 200 may not recognize a voice-initiated action or may determine that the audio data has an absence of a recognizable voice command or voice initiated action. In the event that an absence of a voice-initiated action has been determined by computing device 200, computing device 200 may cause graphical element 204-D to "shake" as an indication that a voice-initiated action has not been determined from a voice input. In other words, arrows 312A, 312B, and 312C show a sequence of movements associated with graphical element 204-D that cause graphical element 204-D to move back and forth, left and right, or otherwise mimic a person shaking his or her head "no."

Said differently, computing device 200 may determine, based on audio data, an absence of a voice-initiated action, and responsive to determining the absence of the voice-initiated action, refrain outputting, for display, the first animation of the change in the position of graphical element 204-A shown in FIGS. 4B-4E to indicate that the voice-initiated action has been determined. Instead, computing device 200 may output GUI 202H having a second animation of a change in the position of graphical element 204-D, that is different from the first animation of GUIs 202B-202E, to indicate that the absence of the voice-initiated action has been determined.

Put another way, a first location of GUI 202H may be positioned left or right of an initial location of GUI 202H and a second location may be positioned opposite the first location and left or right of the initial location. Computing device 202 may present the second animation to indicate the absence of the voice-initiated action by at least outputting graphical element 204-D at a second location of GUI 202H after first outputting graphical element 204-D for display at a first location of GUI 202H. And after outputting graphical element 204-D for display at the second location of GUI 202H, computing device 202 may output graphical element 204-D at an initial location of GUI 202H.

Figure 5:
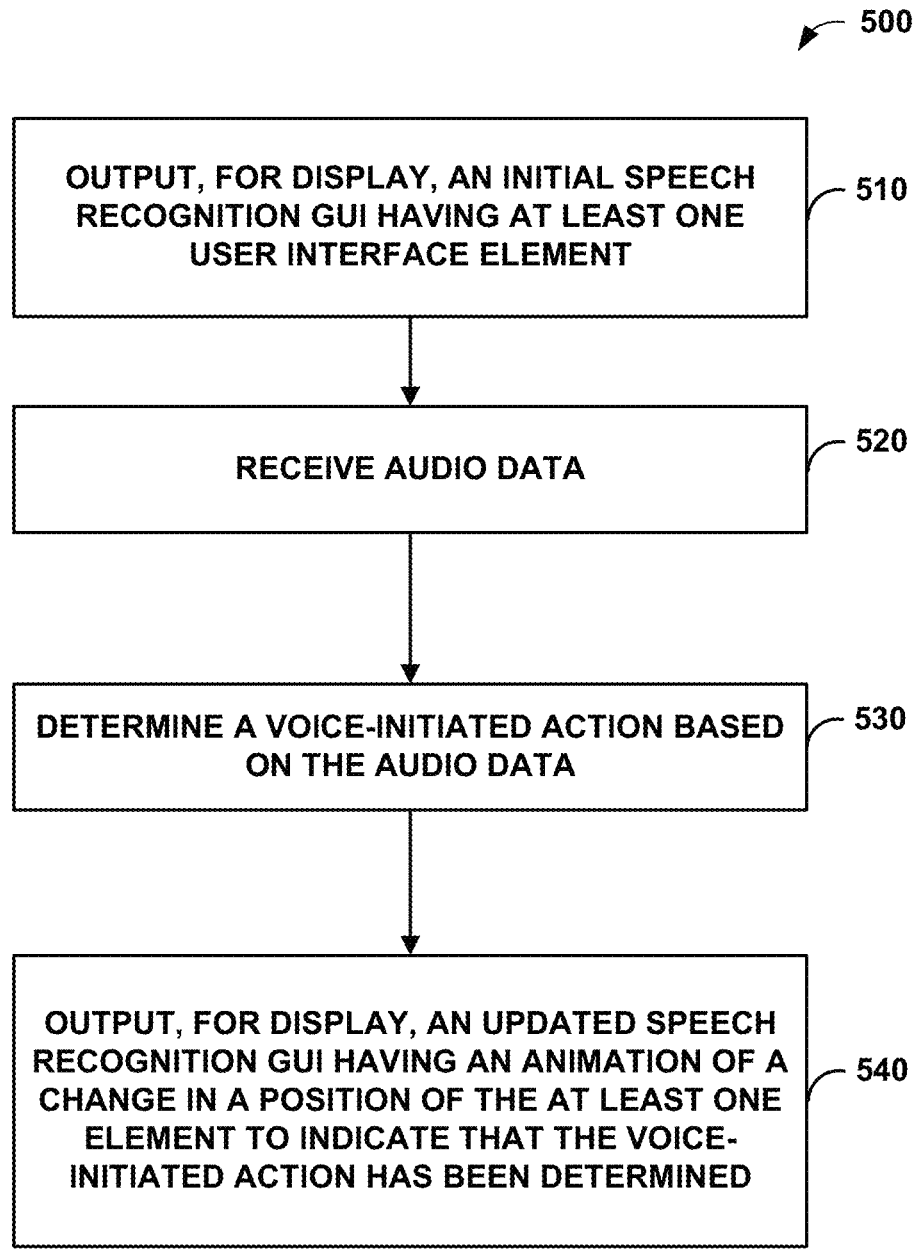
FIG. 5 is a flowchart illustrating example operations of an example computing device that presents a visual confirmation of a recognized voice-initiated action, in accordance with one or more techniques of the present disclosure.

FIG. 5 is a flowchart illustrating example operations of an example device that presents a visual confirmation of a recognized voice-initiated action, in accordance with one or more techniques of the present disclosure. The operations of process 500 of FIG. 5 may be performed by one or more processors of a computing device, such as computing device 2 illustrated in FIG. 1 and FIG. 2. For purposes of illustration, FIG. 5 is described below within the context of computing device 2 illustrated in FIG. 1.

FIG. 5 illustrates that a computing device may output, for display, an initial speech recognition GUI having at least one user interface element (510). For example, UI module 6 of computing device 2 may cause UID 4 to present user interface 16 having graphical element 24. Graphical element 24 may be an icon or text. Graphical element 24 may be presented in a first visual format that includes a first image, such as microphone, or one or more words, such as non-command text 208.

FIG. 5 shows that the computing device may receive audio data (520). For example, microphone 12 of computing device 2 may receive audio data as a user of computing device 2 speaks. Microphone 12 may detect both ambient noise and the speech of the user. Speech recognition module 8 may receive the audio data from microphone 12.

FIG. 5 illustrates that the computing device may determine a voice-initiated action based on the audio data (530). For example, speech recognition module 8 of computing device 2 may determine the voice-initiated action from the audio data. Examples of voice-initiated actions may include sending text messages, outputting music, obtaining navigation directions, initiating a telephone call, telephoning a contact, sending an email, presenting a navigable map, retrieving a webpage, generating a text note, redialing a previously telephoned number, opening and executing an application, telephoning voicemail, presenting a calendar and/or an appointment schedule, searching the Internet, determining a communication signal strength, retrieving network performance statistics or status, outputting battery information, or any other action that can be performed by a computing device.

For example, computing device 2 may transcribe speech from the audio data and determine one or more voice-initiated action by matching the transcribed speech to one or more predefined speech patterns associated with a voice action.

FIG. 5 shows that the computing device output, for display, an updated speech recognition GUI having an animation of a change in a position of the at least one element to indicate that the voice-initiated action has been determined (540). For example, speech recognition module 8 may output information UI module 6 that causes UID 12 to updated user interface 16 and to present graphical element 24 moving between positions 26A and 26D to indicate that the voice-initiated action was determined from the audio data received by microphone 12. Graphical element 24 may appear to above (e.g., at position 26B) and below (e.g., at position 26C) an initial position (e.g., at position 26A and 26D) to indicate that the voice-initiated action was determined. As UID presents the animation of the change in the movement of graphical element 24, graphical element 24 may appear to "nod" similar to a person nodding to provide an affirmative response. In some examples, computing device 2 may output updated user interface 16 while microphone 12 and speech recognition module 8 continue to receive and analyze audio data. In some examples, computing device 2 may output updated user interface 16 prior to voice activation module 10 executing the determined voice-initiated action.

Clause 1. A method comprising: outputting, by a computing device and for display, an initial speech recognition graphical user interface (GUI) having at least one element; receiving, by the computing device, audio data; determining, by the computing device and based on the audio data, a voice-initiated action; and responsive to determining the voice-initiated action, outputting, by the computing device and for display, an updated speech recognition GUI having an animation of a change in a position of the at least one element to indicate that the voice-initiated action has been determined.

Clause 2. The method of clause 1, wherein: the audio data comprises initial audio data, and the updated speech recognition GUI having the animation of the change in the position of the at least one element is output, for display, while receiving additional audio data.

Clause 3. The method of any of clauses 1-2, wherein the updated speech recognition GUI having the animation of the change in the position of the at least one element is output, for display, prior to executing the voice-initiated action based on the audio data.

Clause 4. The method of any of clauses 1-3, wherein: outputting the initial speech recognition GUI for display comprises outputting, by the computing device and for display, the at least one element at an initial location of the initial speech recognition GUI, and outputting the updated speech recognition GUI for display comprises: after outputting the at least one element for display at a first location of the updated speech recognition GUI, outputting, by the computing device, for display at a second location of the updated speech recognition GUI, the at least one element; and after outputting the at least one element for display at the second location of the updated speech recognition GUI, outputting, by the computing device, for display at the initial location, the at least one element, wherein the first location is above the initial location, wherein the second location is below the first location and the initial location.

Clause 5. The method of any of clauses 1-4, wherein the animation of the change in the position of the at least on element to indicate that the voice-initiated action has been determined is a first animation, the method further comprising: determining, by the computing device and based on the audio data, an absence of the voice-initiated action; and responsive to determining the absence of the voice-initiated action: refraining from outputting, by the computing device and for display, the updated speech recognition GUI having the first animation of the change in the position of the at least one element to indicate that the voice-initiated action has been determined; and outputting, by the computing device and for display, the updated speech recognition GUI having a second animation of the change in the position of the at least one element to indicate that the absence of the voice-initiated action has been determined, wherein the second animation is different from the first animation.

Clause 6. The method of clause 5, wherein: outputting the initial speech recognition GUI for display comprises outputting, by the computing device and for display, the at least one element at an initial location of the initial speech recognition GUI, and outputting the updated speech recognition GUI for display comprises: after outputting the at least one element for display at a first location of the updated speech recognition GUI, outputting, by the computing device, for display at a second location of the updated speech recognition GUI, the at least one element; and after outputting the at least one element for display at the second location of the updated speech recognition GUI, outputting, by the computing device, for display at the initial location, the at least one element, wherein the first location is positioned left or right of the initial location, wherein the second location is positioned opposite the first location and left or right of the initial location.

Clause 7. The method of claim any of clauses 1-6, wherein the animation of the change in the position of the at least one element includes at least one of a bounce animation, a shake animation, a fold animation, a crinkle animation, a rotation animation, a zoom animation, or a morph-in-shape animation.

Clause 8. The method of any of clauses 1-7, further comprising: prior to determining the voice-initiated action, outputting, by the computing device and for display, the at least one element having a first visual format; and after determining the voice-initiated action, outputting, by the computing device and for display, the at least one element having a second visual format, different from the first visual format, to further indicate that the voice-initiated action has been determined.

Clause 9. The method of any of clauses 1-8, further comprising: determining, by the computing device, a transcription based on the audio data; and identifying one or more words of the transcription that are associated with the voice-initiated action, wherein the at least one element includes at least a portion of the one or more words.

Clause 10. The method of any of clauses 1-9, wherein: outputting the initial speech recognition GUI for display comprises outputting, by the computing device and for display, the at least one element having an image representative of a speech recognition mode of the computing device, and outputting the updated speech recognition GUI for display comprises outputting, by the computing device and for display, the at least one element having an image representative of the voice-initiated action.

Clause 11. The method of clause 10, wherein the animation of the change in the position of the at least one element comprises a morph animation of the image representative of the speech recognition mode changing into the image representative of the voice-initiated action.

Clause 12. The method of any of clauses 1-11, further comprising responsive to determining the voice-initiated action based on the audio data, performing, by the computing device, the voice-initiated action.

Clause 13. The method of any of clauses 1-15, wherein determining the voice-initiated action further comprises: generating, by the computing device and based at least in part on the audio data, a transcription of the audio data; and determining, by the computing device and based at least in part on a comparison of a at least one word from the transcription or a phrase from the transcription to a preconfigured set of actions, the voice-initiated action.

Clause 14. The method of clause 13, wherein determining the voice-initiated action further comprises: identifying, by the computing device, at least one verb in the transcription; and comparing, by the computing device, the at least one verb to one or more verbs from a set of verbs, each verb in the set of verbs corresponding to at least one action from a plurality of actions including the voice-initiated action.

Clause 15. The method of any of clauses 13-14, wherein determining the voice-initiated action further comprises: determining, by the computing device and based at least in part on data from the computing device, a context; determining, by the computing device and based at least in part on the context, the voice-initiated action.

Clause 16. The method of any of clauses 1-15, wherein outputting, for display, the updated speech recognition GUI comprises: ceasing outputting, by the computing device and for display, of the initial speech recognition GUI; and outputting, by the computing device and for display, the updated speech recognition GUI.

Clause 17. A computing device comprising: at least one processor; and at least one module operable by the at least one processor to: output, for display, an initial speech recognition graphical user interface (GUI) having at least one element; receive audio data; determine, based on the audio data, a voice-initiated action; and responsive to determining the voice-initiated action, output, for display, an updated speech recognition GUI having an animation of a change in a position of the at least one element to indicate that the voice-initiated action has been determined.

Clause 18. The computing device of clause 17, wherein: the audio data comprises initial audio data, and the at least one module is further operable by the at least one processor to output, for display, the updated speech recognition GUI while the at least one module receives additional audio data and prior to the at least one module executing the voice-initiated action based on the audio data.

Clause 19. The computing device of any of clauses 17-18, wherein the animation of the change in the position of the at least one element includes at least one of a bounce animation, a shake animation, a fold animation, a crinkle animation, a rotation animation, a zoom animation, or a morph-in-shape animation.

Clause 20. The computing device of any of clauses 17-19, wherein the at least one module is further operable by the at least one processor to: prior to determining the voice-initiated action, output, for display, the at least one element having a first visual format; and after determining the voice-initiated action, output, for display, the at least one element having a second visual format, different from the first visual format, to further indicate that the voice-initiated action has been determined.

Clause 21. The computing device of any of clauses 17-20, wherein the at least one module is further operable by the at least one processor to: determine a transcription based on the audio data; and identify one or more words of the transcription that are associated with the voice-initiated action, wherein the at least one element includes at least a portion of the one or more words.

Clause 22. The computing device of any of clauses 17-21, wherein: the at least one module is further operable by the at least one processor to output the initial speech recognition GUI for display by at least outputting, for display, the at least one element having an image representative of a speech recognition mode of the computing device, and the at least one module is further operable by the at least one processor to output the updated speech recognition GUI for display by at least outputting, for display, the at least one element having an image representative of the voice-initiated action.

Clause 23. The computing device of any of clauses 17-22, wherein the animation of the change in the position of the at least one element comprises a morph animation of the image representative of the speech recognition mode changing into the image representative of the voice-initiated action.

Clause 24. The computing device of any of clauses 17-23, wherein the at least one module is further operable by the at least one processor to responsive to determining the voice-initiated action based on the audio data, performing, by the computing device, the voice-initiated action.

Clause 25. A computer-readable storage medium comprising instructions that, when executed, configure at least one processor to: output, for display, an initial speech recognition graphical user interface (GUI) having at least one element; receive audio data; determine, based on the audio data, a voice-initiated action; and responsive to determining the voice-initiated action, output, for display, an updated speech recognition GUI having an animation of a change in a position of the at least one element to indicate that the voice-initiated action has been determined.

Clause 26. The computer-readable storage medium of clause 25, wherein: the audio data comprises initial audio data, and the computer-readable storage medium comprises additional instructions that, when executed, further configure the at least one processor to output, for display, the updated speech recognition GUI while the at least one processor receives additional audio data and prior to the at least one processor executing the voice-initiated action based on the audio data.

Clause 27. The computer-readable storage medium of any of clauses 25-26, wherein the animation of the change in the position of the at least one element includes at least one of a bounce animation, a shake animation, a fold animation, a crinkle animation, a rotation animation, a zoom animation, or a morph-in-shape animation.

Clause 28. The computer-readable storage medium of any of clauses 25-27, wherein the computer-readable storage medium comprises additional instructions that, when executed, configure the at least one processor to: prior to determining the voice-initiated action, output, for display, the at least one element having a first visual format; and after determining the voice-initiated action, output, for display, the at least one element having a second visual format, different from the first visual format, to further indicate that the voice-initiated action has been determined.

Clause 29. The computer-readable storage medium of any of clauses 25-28, wherein the computer-readable storage medium comprises additional instructions that, when executed, configure the at least one processor to: determine a transcription based on the audio data; and identify one or more words of the transcription that are associated with the voice-initiated action, wherein the at least one element includes at least a portion of the one or more words.

Clause 30. The computer-readable storage medium of any of clauses 25-29, wherein: the computer-readable storage medium comprises additional instructions that, when executed, configure the at least one processor to output the initial speech recognition GUI for display by at least outputting, for display, the at least one element having an image representative of a speech recognition mode of the computing device, and the computer-readable storage medium comprises additional instructions that, when executed, configure the at least one processor to output the updated speech recognition GUI for display by at least outputting, for display, the at least one element having an image representative of the voice-initiated action.

Clause 31. The computer-readable storage medium of any of clauses 25-30, wherein the animation of the change in the position of the at least one element comprises a morph animation of the image representative of the speech recognition mode changing into the image representative of the voice-initiated action.

Clause 32. The computer-readable storage medium of any of clauses 25-31, wherein the computer-readable storage medium comprises additional instructions that, when executed, configure the at least one processor to: responsive to determining the voice-initiated action based on the audio data, performing, by the computing device, the voice-initiated action.

Clause 33. A computing device comprising means for performing any of the methods of clauses 1-16.

Clause 34. A computer-readable storage medium comprising instructions that, when executed, configure one or more processors to perform any of the methods of clauses 1-16.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. A computer-readable medium may include computer-readable media. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   while receiving an initial portion of a first voice input, outputting, by a computing device and for display, an initial speech recognition graphical user interface (GUI) including at least one element;
   determining whether any voice-initiated action from a predetermined set of actions is associated with the initial portion of the first voice input:
   while receiving a subsequent portion of the first voice input:
      responsive to determining that no voice-initiated action from a predetermined set of actions is associated with the initial portion of the first voice input, outputting, by the computing device, for display, a first updated speech recognition GUI including a shake type animation in which the at least one element from the initial speech recognition GUI moves left and right one or more times in a horizontal direction to mimic a person shaking a head as an indication of a negative response that none of the voice-initiated actions from the predetermined set of actions has been determined based on the initial portion of the first voice input;

while receiving an initial portion of a second voice input outputting, by the computing device and for display, the initial speech recognition GUI including the at least one element; and determining whether any voice-initiated action from the predetermined set of actions is associated with the initial portion of the second voice input; and while receiving a subsequent portion of the second voice input:

responsive to determining that a particular voice-initiated action from the predetermined set of actions is associated with the initial portion of the second voice input:

outputting, by the computing device, for display, a second updated speech recognition GUI including a nod type animation in which the at least one element from the initial speech recognition GUI moves up and down one or more times in a vertical direction to mimic the person nodding the head as an indication of an affirmative response that the voice-initiated action has been determined based on the initial portion of the second voice input; and after outputting the second updated speech recognition GUI, executing the voice-initiated action based on the initial portion of the second voice input and the subsequent portion of the second voice input.

2. The method of claim 1, wherein outputting the initial speech recognition GUI for display while receiving the initial portion of the second voice input includes outputting the at least one element for display in a first visual format indicating the computing device is receiving the second voice input.

3. The method of claim 2, wherein outputting the second updated speech recognition GUI for display includes outputting the at least one element for display in a second visual format, the second visual format being different than the first visual format and further indicating the affirmative response that the voice-initiated action has been determined based on the initial portion of the second voice input.

4. The method of claim 1, wherein:

outputting the initial speech recognition GUI for display comprises outputting the at least one element for display at an initial location of a display device, outputting the first updated speech recognition GUI comprises outputting the at least one element for display at the initial location of the display device after outputting the at least one element for display at a second location of the display device, and outputting the second updated speech recognition GUI comprises outputting the at least one element for display at the initial location of the display device after outputting the at least one element for display at the second location of the display device.

5. A computing device comprising:

at least one processor; and at least one module operable by the at least one processor to:

while receiving an initial portion of a first voice input, output, for display, an initial speech recognition graphical user interface (GUI) including at least one element;

determine whether any voice-initiated action from a predetermined set of actions is associated with the initial portion of the first voice input;

while receiving a subsequent portion of the first voice input:

responsive to determining that no voice-initiated action from a predetermined set of actions is associated with the initial portion of the first voice input, output, for display, a first updated speech recognition GUI including a shake type animation in which the at least one element from the initial speech recognition GUI moves left and right one or more times in a horizontal direction to mimic a person shaking a head as an indication of a negative response that none of the voice-initiated actions from the predetermined set of actions has been determined based on the initial portion of the first voice input;

while receiving an initial portion of a second voice input output for display, the initial speech recognition GUI including the at least one element; and determine whether any voice-initiated action from the predetermined set of actions is associated with the initial portion of the second voice input; and while receiving a subsequent portion of the second voice input:

responsive to determining that a particular voice-initiated action from the predetermined set of actions is associated with the initial portion of the second voice input:

output, for display, a second updated speech recognition GUI including a nod type animation in which the at least one element from the initial speech recognition GUI moves up and down one or more times in a vertical direction to mimic the person nodding the head as an indication of an affirmative response that the voice-initiated action has been determined based on the initial portion of the second voice input; and after outputting the second updated speech recognition GUI, execute the voice-initiated action based on the initial portion of the second voice input and the subsequent portion of the second voice input.

6. The computing device of claim 5, wherein the at least one module is further operable by the at least one processor to output the initial speech recognition GUI for display while receiving the initial portion of the second voice input by at least outputting the at least one element for display in a first visual format indicating the computing device is receiving the second voice input.

7. The computing device of claim 6, wherein the at least one module is further operable by the at least one processor to output the second updated speech recognition GUI for display by at least outputting the at least one element for display in a second visual format, the second visual format being different than the first visual format and further indicating the affirmative response that the voice-initiated action has been determined based on the initial portion of the voice second input.

8. The computing device of claim 5, wherein the at least one module is further operable by the at least one processor to:

output the initial speech recognition GUI for display by at least outputting the at least one element for display at an initial location of a display device;

output the first updated speech recognition GUI by at least outputting the at least one element for display at the initial location of the display device after outputting the at least one element for display at a second location of the display device; and output the second updated speech recognition GUI by at least outputting the at least one element for display at the initial location of the display device after outputting the at least one element for display at the second location of the display device.

9. A non-transitory computer-readable storage medium comprising instructions that, when executed, cause at least one processor of a computing device to:
while receiving an initial portion of a first voice input, output, for display, an initial speech recognition graphical user interface (GUI) including at least one element;
determine whether any voice-initiated action from a predetermined set of actions is associated with the initial portion of the first voice input:
while receiving a subsequent portion of the first voice input:
responsive to determining that no voice-initiated action from a predetermined set of actions is associated with the initial portion of the first voice input, output, for display, a first updated speech recognition GUI including a shake type animation in which the at least one element from the initial speech recognition GUI moves left and right one or more times in a horizontal direction to mimic a person shaking a head as an indication of a negative response that none of the voice-initiated actions from the predetermined set of actions has been determined based on the initial portion of the first voice input;
while receiving an initial portion of a second voice input output for display, the initial speech recognition GUI including the at least one element; and
determine whether any voice-initiated action from the predetermined set of actions is associated with the initial portion of the second voice input; and
while receiving a subsequent portion of the second voice input:
responsive to determining that a particular voice-initiated action from the predetermined set of actions is associated with the initial portion of the second voice input:
output, for display, a second updated speech recognition GUI including a nod type animation in which the at least one element from the initial speech recognition GUI moves up and down one or more times in a vertical direction to mimic the person nodding the head as an indication of an affirmative response that the voice-initiated action has been determined based on the initial portion of the second voice input; and
after outputting the second updated speech recognition GUI, execute the voice-initiated action based on the initial portion of the second voice input and the subsequent portion of the second voice input.

10. The non-transitory computer-readable storage medium of claim 9, wherein the instructions, when executed, cause the at least one processor to output the initial speech recognition GUI for display while receiving the initial portion of the second voice input by at least outputting the at least one element for display in a first visual format indicating the computing device is receiving the second voice input.

11. The non-transitory computer-readable storage medium of claim 10, wherein the instructions, when executed, cause the at least one processor to output the second updated speech recognition GUI for display by at least outputting the at least one element for display in a second visual format, the second visual format being different than the first visual format and further indicating the affirmative response that the voice-initiated action has been determined based on the initial portion of the voice input.

12. The non-transitory computer-readable storage medium of claim 9, wherein the instructions, when executed, cause the at least one processor to:
output the initial speech recognition GUI for display by at least outputting the at least one element for display at an initial location of a display device;
output the first updated speech recognition GUI by at least outputting the at least one element for display at the initial location of the display device after outputting the at least one element for display at a second location of the display device; and
output the second updated speech recognition GUI by at least outputting the at least one element for display at the initial location of the display device after outputting the at least one element for display at the second location of the display device.

* * * * *